E. E. FLORA & J. F. MURPHY.
MANTLE THREADING MACHINE.
APPLICATION FILED MAR. 14, 1914.
1,151,579.
Patented Aug. 31, 1915.
8 SHEETS—SHEET 6.
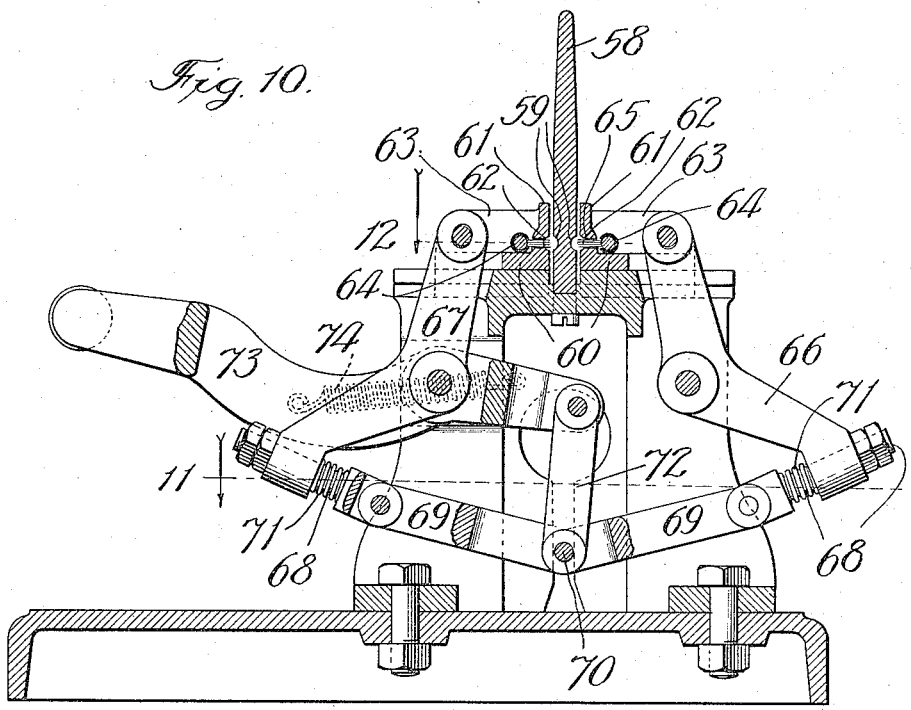
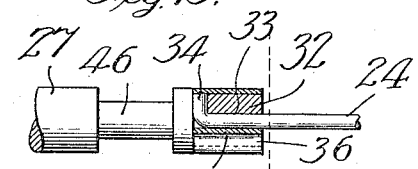
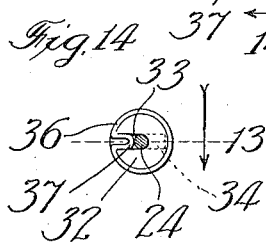
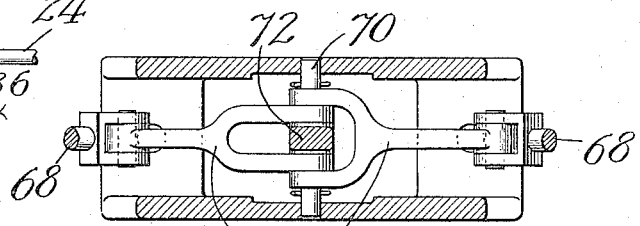
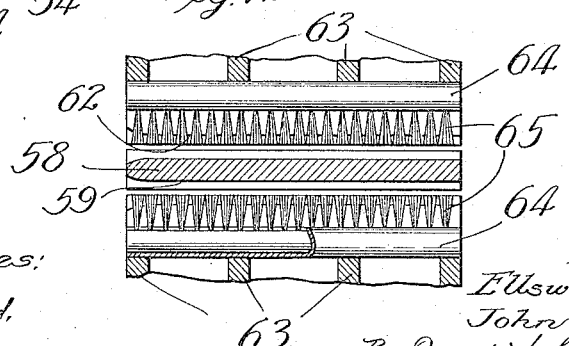
Witnesses:
Inventor:
Ellsworth E. Flora and
John F. Murphy,
By Dyrenforth, Lee, Chritton & Wiles,
Attys.
COLUMBIA PLANOGRAPH CO., WASHINGTON, D. C.

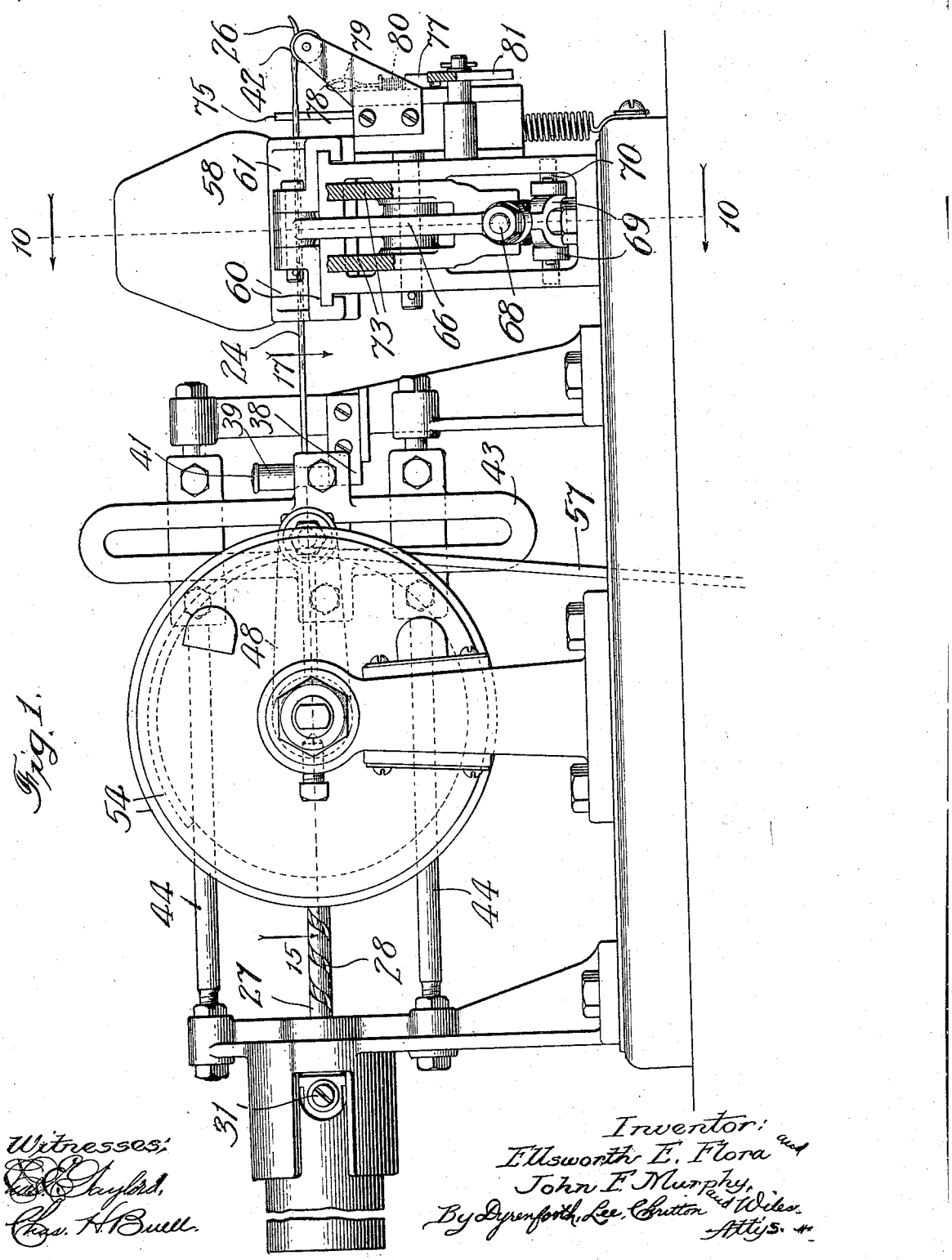

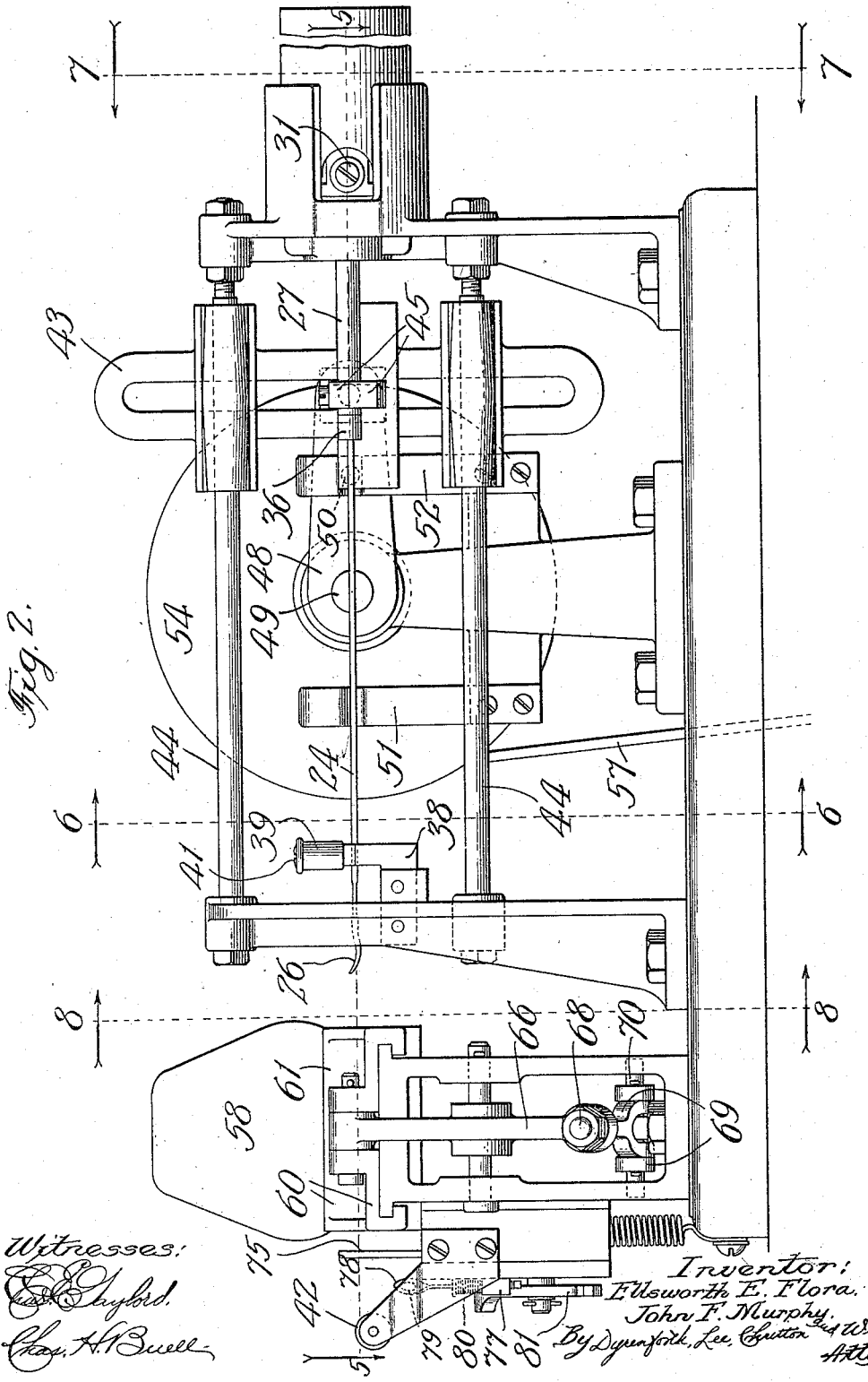

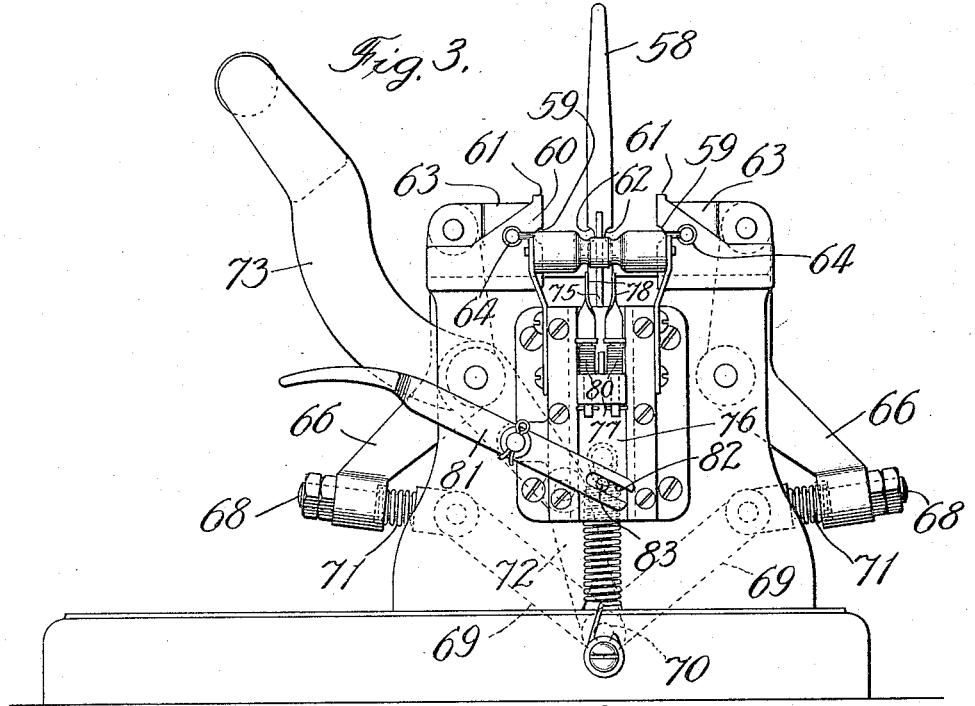
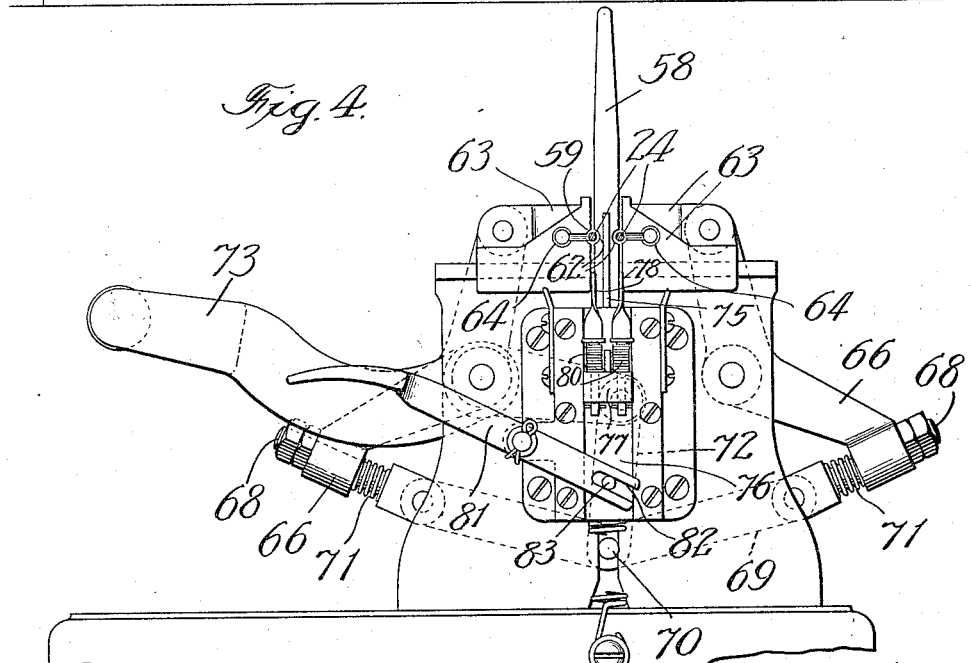

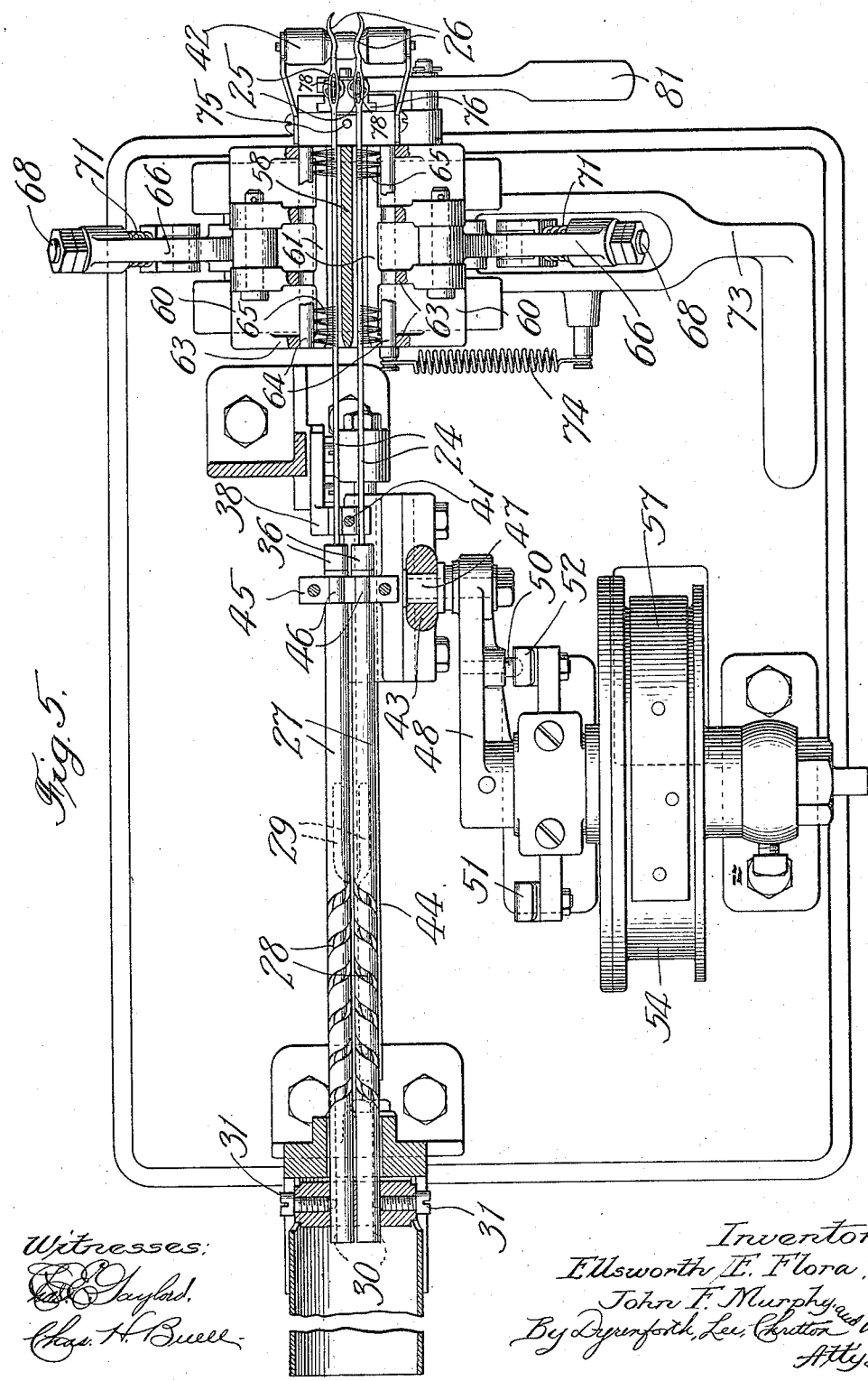

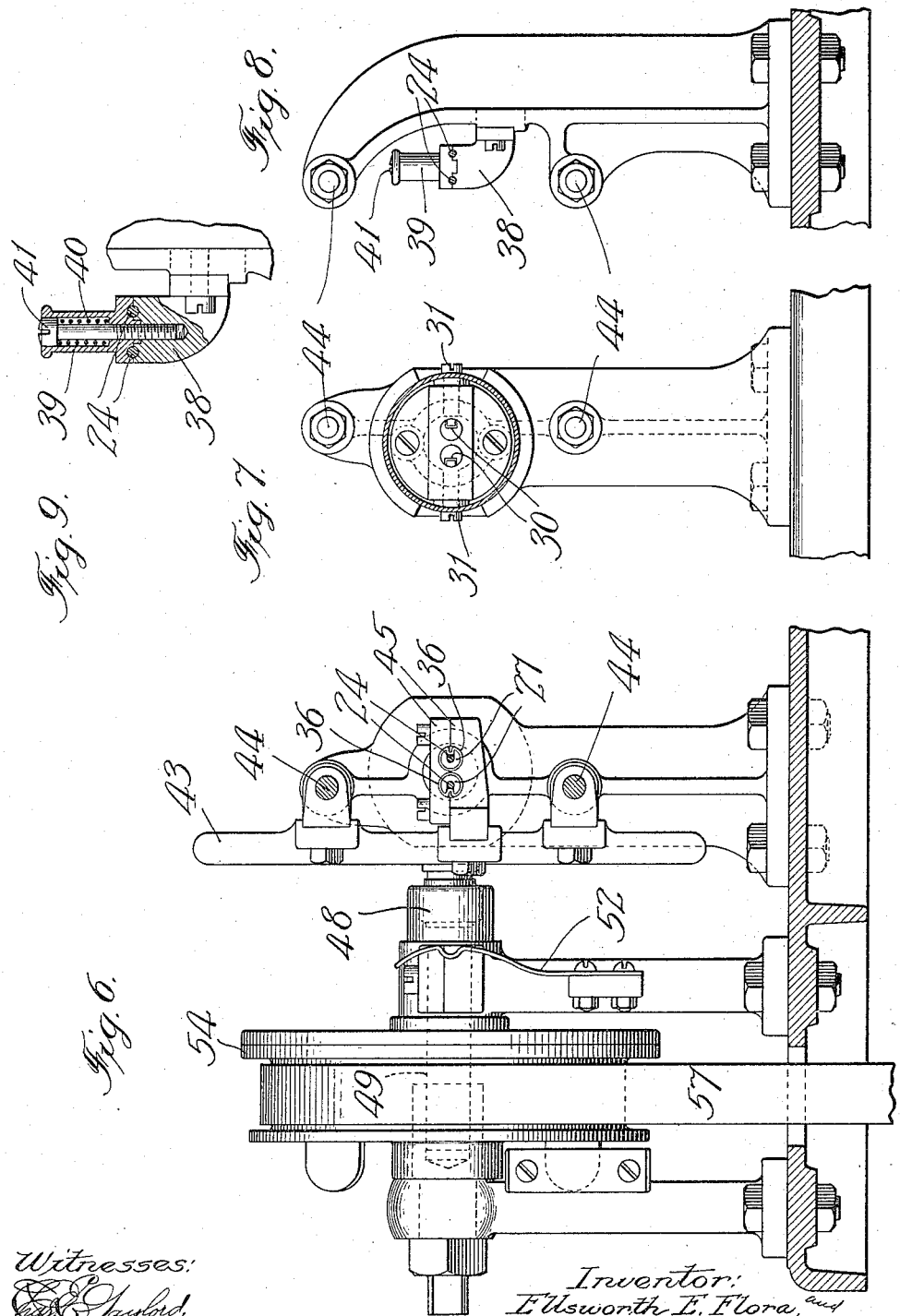

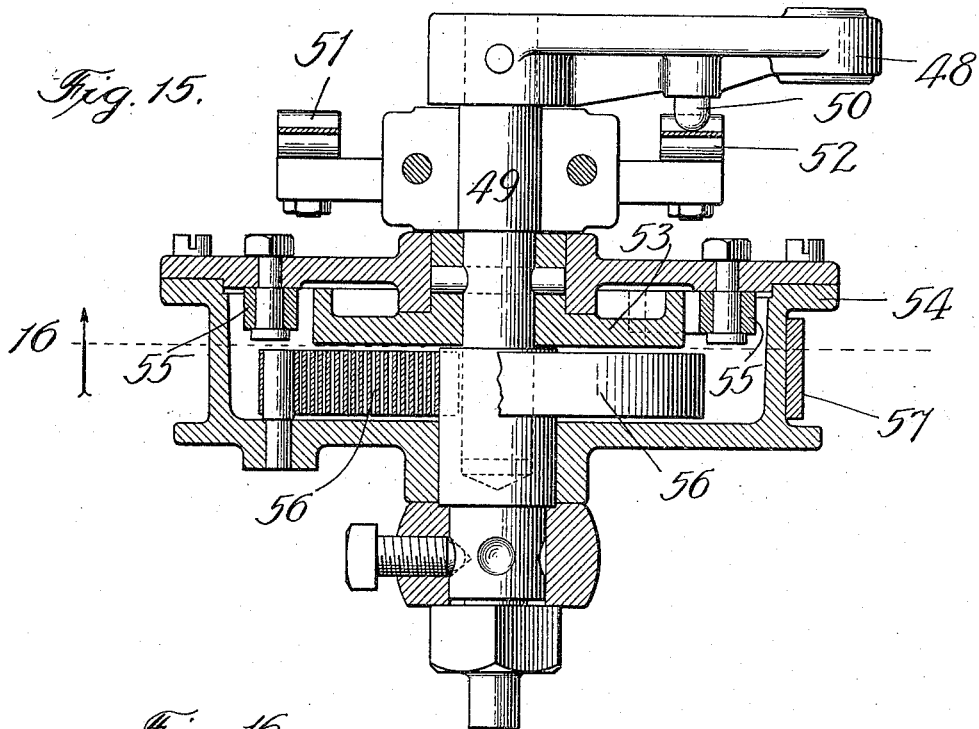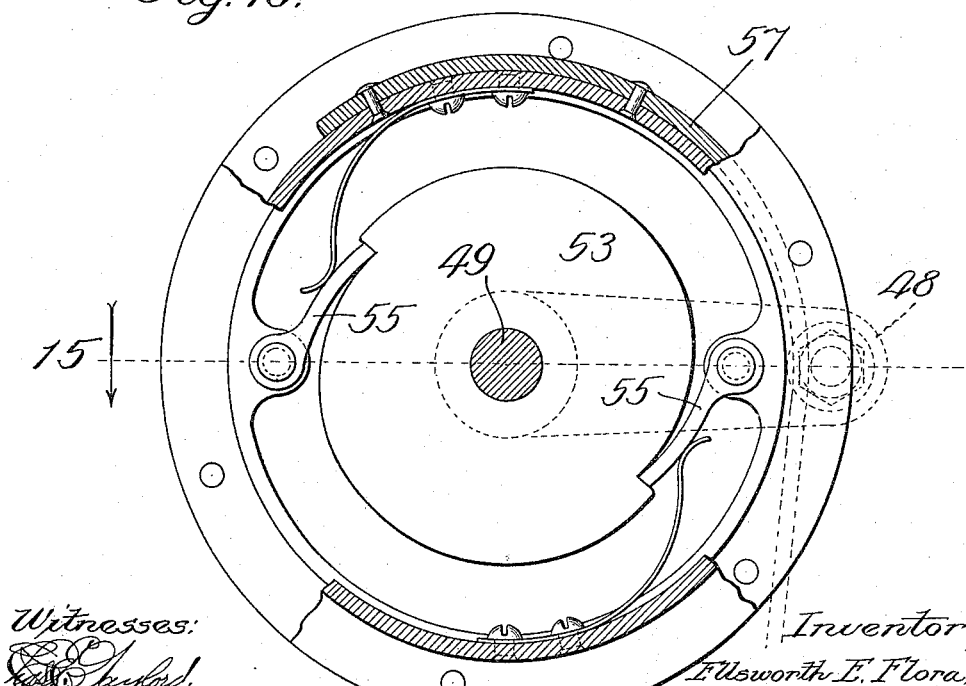

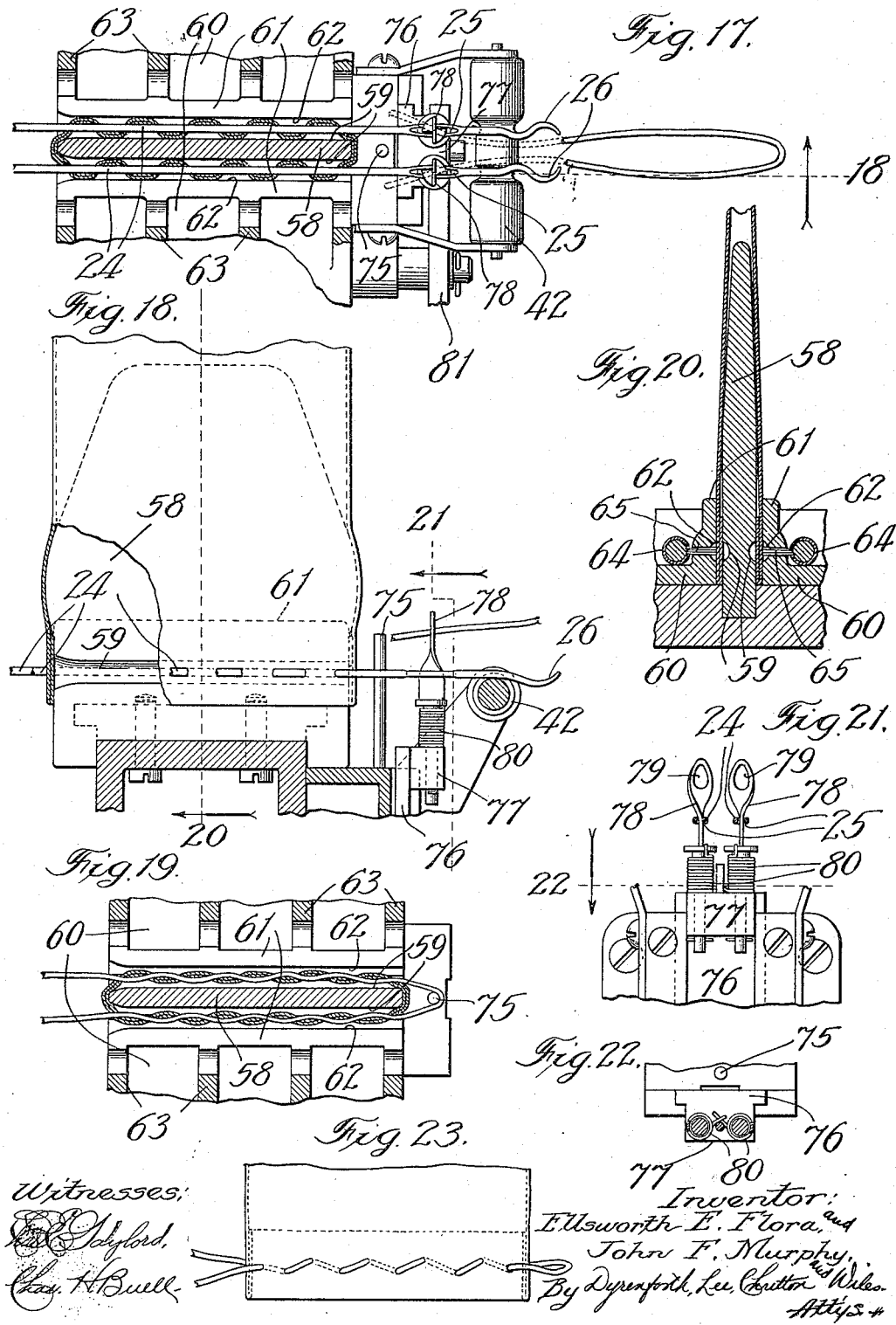

UNITED STATES PATENT OFFICE.

ELLSWORTH E. FLORA AND JOHN F. MURPHY, OF CHICAGO, ILLINOIS, ASSIGNORS, BY MESNE ASSIGNMENTS, TO MANTLE MACHINERY AND PATENTS COMPANY, OF NEW YORK, N. Y., A CORPORATION OF NEW YORK.

MANTLE-THREADING MACHINE.

1,151,579.     Specification of Letters Patent.     Patented Aug. 31, 1915.

Application filed March 14, 1914. Serial No. 824,643.

*To all whom it may concern:*

Be it known that we, ELLSWORTH E. FLORA and JOHN F. MURPHY, citizens of the United States, residing at Chicago, in the county of Cook and State of Illinois, have invented a new and useful Improvement in Mantle-Threading Machines, of which the following is a specification.

Our invention relates to certain new and useful improvements in mantle-threading machines and is fully described and explained in the specification and shown in the accompanying drawings, in which:

Figure 1 is a side elevation of my improved device; Fig. 2 is a similar view from the opposite side, but showing the needle retracted; Fig. 3 is a front view of the device; Fig. 4 is a similar view with the clamping jaws brought together; Fig. 5 is a section on the line 5 of Fig. 2; Fig. 6 is a vertical section on the line 6 of Fig. 2; Fig. 7 is a vertical section on the line 7 of Fig. 2; Fig. 8 is a vertical section on the line 8 of Fig. 2; Fig. 9 is a vertical section through the needle guide shown in elevation in Fig. 8; Fig. 10 is a vertical section on the line 10 of Fig. 1; Fig. 11 is a section on the line 11 of Fig. 10; Fig. 12 is a section on the line 12 of Fig. 10; Fig. 13 is a view partly in elevation and partly in section of the needle-clamping device; Fig. 14 is a section on the line 14 of Fig. 13; Fig. 15 is a horizontal section on the line 15 of Figs. 1 and 16, and Fig. 16 is a vertical longitudinal section on the line 16 of Fig. 15; Fig. 17 is a broken horizontal section on the line 17 of Fig. 1, showing the operation; Fig. 18 is an elevation of the same part as Fig. 17, with the threading-device in the threading position; Fig. 19 is a view of certain of the parts shown in Fig. 17 and on the same line, showing the mantle threaded; Fig. 20 is a transverse section on the line 20 of Fig. 18, the mantle being placed for threading and the needle is not yet advanced; Fig. 21 is a front elevation on the line 21 of Fig. 18, showing the needle-threading device; Fig. 22, a horizontal section on the line 22 of Fig. 21, and Fig. 23 is an elevation of the threaded mantle.

Before proceeding to a detailed description of the structure of the several parts, a general introductory outline of the operation will be attempted, in order that when the parts are specifically enumerated, their general purpose having been set forth, their operation may be more readily apparent. The machine is provided with a central, vertical mantle-receiving part or stretcher, tapered at its upper end the more readily to receive the mantles, this part being shown at the right-hand end of Fig. 1. The mantle is slipped over this stretcher by the operator and there are then brought in contact with it, to hold it tightly against the stretcher, two clamps on opposite sides. The two sides of the mantle are thus held tight and flat between the clamps and stretcher. The stretcher has, on its two sides, semi-cylindrical grooves and corresponding grooves to register therewith are provided in the faces of the clamps. These grooves thus form cylindrical channels through which the threading needles may be advanced, the mantle occupying the centers of the channels.

The threading needles themselves are provided with spiral portions at their ends and as they are advanced to pass through the mantle sides, they are given a simultaneous rotary motion, so as to pass several times through the mantle sides in opposite directions in their advancement. The needles are locked in their forward position temporarily and are then threaded. This is accomplished by threading-devices which pass upward through the eyes of the needles and into which the ends of the thread to be inserted in the mantles may be passed by the operator. The threaders then descend, pulling the ends of the thread through the needles. The needles are then retracted and they draw the two ends of the thread with them several times through the material of the mantle, one end of the thread passing on each side of the stretcher. After the retraction of the needles, the clamps are separated to release the mantle, the mantle is removed from the stretcher and the operation is repeated.

The mechanism thus falls into several distinct parts, all of which coöperate to the same common end, but which can be conveniently considered separately. The first portion of the mechanism is that for supporting, guiding, advancing and rotating the needles. The second is the mantle stretcher, clamps and means for operating them, and the third is the threading-mechanism.

Referring to the drawings, 24 are the needles provided with eyes 25 near their ends, and just in advance of the eyes, with spiral parts 26. Behind the needles are needle-shafts 27, each of which has a spiral groove 28 near its rear end, the grooves terminating in straight parts 29 and 30. These grooves are engaged by screws 31, stationarily mounted, so that, as the needle-shafts are advanced, they move a certain distance without rotation, then rotate, and then move further without rotation. It will be obvious from the general description that the rotation occurs while the points of the needles are traversing the mantle.

The needles are held in the needle-shafts and made readily removable therefrom by the structure shown in Figs. 13 and 14. Each needle-shaft has, near its front end, a slightly reduced part 32 having a radial slot 33, at the rear end of which is a radial opening to receive the end 34 of the needle which is bent at right-angles. The needles are held in position by cylindrical clips 36 having inwardly-extending bent parts 37 which enter the radial slots in the forward ends of the needle-shafts to hold the needles in place. The needle is placed in position and the clip pushed down from the forward end, so that a firm lock is attained. The mere slipping off of the clip frees the needle.

The needles themselves are guided in their movement by the parts shown in Figs. 8 and 9. A stationary part of the frame carries just below the path of the needles a grooved part 38 in which the needles rest. A grooved cap 39 is pressed down on the part 38 to hold the needles yieldingly in place by means of a spring 40 confined by a screw 41. This steadies the needles and holds them in the proper alinement. At their extreme forward limit the forward ends of the needles run over a roller 42, whereby they are also steadied.

The needles are propelled backward and forward by a vertical cross-head 43 guided on rods 44 and having engagement, by means of blocks 45 attached to it, with reduced parts 46 just back of the front ends of the needle-shafts. The reciprocation of the cross-head back and forth upon its guides, thus obviously propels the needles, which rotate as hereinbefore set forth. The cross-head is reciprocated by the engagement, with its vertical slot, of a crank-pin 47 of a crank 48 on a transverse shaft 49. The rotation of this crank obviously produces the desired result. In order to lock the cross-head in its forward and back position, the crank is provided with a pin 50 engaging springs 51 and 52 to hold it with a moderate force at its two extremes of movement.

With the construction thus far described it is obviously necessary to impart to the crank and shaft 49 180° of revolution, then to stop the rotation while the needle is threaded at the one extreme of its movement, or while the mantle is changed at the other, and then to impart another 180° of rotation. This is accomplished by the ratchet mechanism shown best in Figs. 15 and 16. The shaft has fast on it a ratchet 53 having, in the preferred form of construction, only two teeth 180° apart. Outside of this ratchet is a barrel 54 provided with pawls 55 engaging the ratchet teeth. The barrel is normally rotated to the left as shown in Fig. 16, that is, in the reverse direction to that in which its pawls are effective, by means of a spring 56. It may be rotated in the opposite direction by a strap 57 which may run to a treadle controlled by the operator's foot. The operation will now be obvious. The barrel is rotated half a turn, advancing the needles and latches in its forward position as hereinbefore set forth. While the needle is being threaded the operator releases the strap and the barrel turns back. After the needle is threaded another and similar operation by the operator imparts to the barrel and shaft another half turn so as to retract the needle. This substantially concludes the description of the needles, their supports, guides and propelling mechanism.

The mantle-holding and clamping mechanism will now be described. 58 is the stretcher, this being in the form of a flat vertical plate tapered at its upward end to facilitate slipping the mantles thereover rapidly. The stretcher has semi-cylindrical grooves 59 at its lower end, in line with the path of the needles, 60 are the clamping-jaws, generally, and each is provided with a vertical web 61 to oppose the stretcher, the vertical webs being provided with grooves 62 opposite the grooves 59 in the stretcher. The vertical webs are supported by transverse ribs 63. The ribs are traversed by a longitudinal perforation to receive tubes 64, the vertical webs in the center of the grooves 62 being slotted for the passage of bristles 65 which are supported in and carried by the tubes 64. These bristles are very desirable in that they hold the mantle yieldingly toward the stretcher even where unsupported by the rigid clamps. If the mantle is placed upon the stretcher with care, so as to be perfectly smooth and without any slack, these bristles are unnecessary. It occasionally happens, however, that a careless operator working at high speed puts on the mantle and crowds it down too far, so that there is some slack left. This may result in leaving an extra fold of material in the space between the grooves of the clamps and stretcher so that when the needle-point moves forward in its spiral course, it will meet with loose material which it cannot pass through and will thus drop a stitch. The yielding bristles exert sufficient pressure on the mantle that the stitches are not dropped in this manner, and yet, of course, the bristles interfere in no way with the movement and operation of the needle, because they simply move out of its way as it passes.

To move the clamping-jaws in and out, they are pivoted to bell-crank levers 66 and 67, the pivot perforations in the upper arms of the bell-crank levers being slightly enlarged vertically to permit play of the pivot-pins therein, so that the jaws may move, in right lines, while the bell-cranks swing upon their pivots. The lower ends of the bell-cranks are slidable on pins 68 pivoted on toggle-levers 69 mutually pivoted upon a central pivot-pin 70. Springs 71 surround the pins 68 to hold the bell-cranks out and yet to permit a limited yield. The central pivot-pin of the toggles is connected to a link 72, the upper end of which is pivoted to the inner end of a hand-operated lever 73 of the first order. When the lever 73 is moved up by the operator from the position shown in Figs. 10 and 4, to that shown in Fig. 3, the inner ends of the toggle-levers move down, pulling together the lower ends of the bell-cranks, as shown in Fig. 3, and separating the jaws. Lowering the handle by opposite movement of the parts draws the jaws together into clamping position.

The jaws are held in either position, that is, in clamping position or separated, by means of a spring 74 connecting the hand-lever 73 with the stationary part of the frame, this spring being so disposed that it swings past the pivot of the hand-lever on the frame, so as to form a dead-center lock in both directions.

This concludes the description of the needle-advancing and mantle-clamping mechanisms. Their mutual coöperation will have been made plain by the initial description of the general principle of operation. The work accomplished will be understood by reference to Figs. 17, 18, 19, 20 and 23. The mantle is placed in position and the jaws closed upon it. The needles are then advanced, rotating as they move, and thus pass repeatedly through the two sides of the mantle to the position shown in Figs. 17 and 18. By the threading mechanism hereinafter to be described, the opposite ends of an asbestos cord loop are passed downward through the eyes of the needles. The needles are then retracted and pull the loop into the mantle as shown in Fig. 19. At the end of their movement, the loop at the front end of the cord catches on a stripping-pin 75 which stops its further movement with the needles so that in the last part of the retraction of the needles they pull off the ends of the cord, leaving the parts as shown in Fig. 19 with the cord entirely free from the needles and threaded through the mantle sides. The jaws are then separated and the mantle with its cord pulled off the stretcher.

The threading mechanism will now be set forth. Vertically movable upon the front of the machine is a threader-plate 76, in a forward projection 77 of which are mounted threaders 78 of light sheet-metal, each having an eye 79 at its upper end. The threaders are mounted to rotate freely on their vertical axes and each is twisted 90° with a spiral twist. Springs 80 surround the threaders and normally hold them with their upper eyed parts in a plane longitudinal of the machine. When the threader-plate is brought up, the upper part of the threaders pass through the eyes of the needles. The eyes engage with the twisted surfaces thereof, and a screwing action takes place turning the threaders 90° against the springs 80, so that their upper parts stand at right-angles to the needles at the end of their upward movement. The operator then passes the ends of the thread through the eyes of the threaders, as shown in Fig. 18. The threader-plate is then depressed and the threaders drawn out of the eyes of the needles, carrying with them the ends of the thread from which they promptly disengage themselves by further downward movement. The threader-plate is reciprocated by a lever 81 slotted at 82 to engage a pin 83 on the threader-plate. As the operator pushes down the outer end of the lever 81, the threader-plate and threaders obviously rise to secure the result heretofore set forth.

What we claim as new and desire to secure by Letters Patent is:—

1. In combination, members between which a portion of a mantle can be clamped, registering grooves in said members, a needle having a spiral end, and means for advancing and rotating the needle through the grooves to traverse the mantle.

2. In combination, a stretcher over which a mantle can be placed, clamping jaws to coöperate therewith, registering grooves in the stretcher and jaws, means to close and open the jaws, needles provided with spiral ends, and means for advancing and retracting the needles and for rotating them while in longitudinal movement to cause them to traverse the grooves in the jaws and stretcher and to penetrate the two sides of the mantle.

3. In combination, a stretcher over which a mantle can be placed, jaws on the two sides thereof, registering grooves in the jaws and stretcher, means to close and open the jaws, two needles provided with spiral points, needle-shafts provided with threads, means engaging the threads to rotate the needles and shafts when longitudinally moved, and means to reciprocate the needles to cause them to traverse the grooves in the jaws and stretcher and to penetrate the sides of the mantle when held by the jaws alternately from opposite sides.

4. In combination, a stretcher over which a mantle may be placed, jaws to coöperate therewith, registering grooves in the jaws and stretcher, bell-cranks connected to the jaws, toggle levers yieldingly connected with the bell-cranks and mutually pivoted together, and means for reciprocating the pivot of the toggle-levers to open and close the jaws, needles provided with spiral points, and means for advancing and retracting the needles and for rotating them while in longitudinal movement to cause them to traverse the grooves in the jaws and stretcher and to pass through the sides of the mantle alternately in opposite directions.

5. In combination, means for holding a portion of a mantle in a plane, a needle provided with a spiral end, and means for advancing the needle substantially in the plane of said part of the mantle and for rotating the needle while advancing it, whereby its point passes through the plane of the mantle alternately from opposite sides, and elastic means engaging the mantle to hold it snugly in position.

6. In combination, opposing surfaces between which a part of a mantle can be grasped, registering grooves in said surfaces, a spiral needle, means for advancing and rotating the needle to cause it to traverse the grooves and pass through the mantle-part alternately in opposite directions, and yielding means engaging the mantle in the grooves, for the purpose set forth.

7. In combination, opposing surfaces between which a part of a mantle can be grasped, registering grooves in said surfaces, a spiral needle, means for advancing and rotating the needle to cause it to traverse the grooves and pass through the mantle-part alternately in opposite directions, and a series of elastic bristles in one of the grooves to engage the mantle, for the purpose set forth.

8. In combination, a stretcher to receive a mantle, jaws on opposite sides thereof, means for opening and closing the jaws, registering grooves in the jaws and stretcher, needles with spiral ends, means for reciprocating and rotating the needles, slots entering the sides of the grooves in the jaws and bristles projecting from said slots into the jaw-grooves to engage the mantle, for the purpose set forth.

9. In combination, a stretcher to receive a mantle, jaws on opposite sides thereof, means to open and close the jaws, registering grooves in the jaws and stretcher, needles with spiral ends, means to advance and rotate the needles and a stripper-pin adjacent to the end of the stretcher to engage a thread-loop to strip it from the needles upon their retraction.

10. In a device of the class described, a stretcher and jaws to receive and hold a mantle, reciprocable needles to traverse the mantle and provided with eyes near their ends, a reciprocable threader-plate, eyed threaders pivotally mounted thereon and adapted to pass through said eyes, said threaders being twisted to be turned by engagement with the needles in their passage therethrough, for the purpose set forth.

11. In a device of the class described, reciprocable needles, a stretcher and mantle-gripping jaws in combination with a needle-guide comprising a grooved-stationary member in which the needles lie, and a spring-pressed grooved cap opposed thereto.

12. In a device of the character described, a stretcher, jaws to oppose the same for holding a mantle, reciprocable needles, and means for reciprocating the needles comprising a cross-head, a crank engaging the cross-head, operating means, ratchet mechanism connecting the crank with the operating means whereby successive movements of the operating mechanism first advance and then retract the needles.

13. In apparatus of the character described, a spiral needle, means for rotating the same, a work holder, means for relatively moving the work holder and needle, to cause the needle to pass through the work on the holder, and means for clamping the work on the holder simultaneously on opposite sides of the path of the needle.

14. In apparatus of the character set forth, a work holder, spaced spiral needles that operate on opposite sides of the holder, and means for relatively moving the needles and work holder, to cause the former to pass through spaced portions of the fabric placed upon the holder.

15. In apparatus of the character set forth, a work holder, spaced spiral needles that operate on opposite sides of the holder, means for relatively moving the needles and work holder, to cause the former to pass through spaced portions of the fabric placed upon the holder, and means for clamping the work on opposite sides of the holder during the passage of the needles.

16. In apparatus of the character set forth, a work holder, spaced spiral needles that operate on opposite sides of the holder, means for relatively moving the needles and work holder, to cause the former to pass through spaced portions of the fabric placed upon the holder, and means for clamping the work on opposite sides of the holder during the passage of the needles, said clamping means and work holder leaving passageways between them for the passage of the needles.

17. In apparatus of the character set forth, a needle having a spiral front portion and a substantially straight shank, and an eye in the shank in rear of the spiral, in combination with means for rotating said needle, a work holder, and means for relatively moving the needle and work holder to cause the needle to pass through the work carried by said holder.

18. In apparatus of the character set forth, a needle comprising a substantially straight shank, a spiral end, and an eye at substantially the junction of the shank and spiral end, in combination with means for rotating said needle, a work holder, and means for relatively moving the needle and work holder to cause the needle to pass through work carried by said holder.

19. In apparatus of the character set forth, a needle comprising a substantially straight shank having a spiral front end and an eye located in the shank in rear of the spiral portion, and means for rotating the needle.

20. In apparatus of the character set forth, a needle having a substantially straight shank and a spiral front end, means for moving the needle longitudinally and rotating the same, and a bearing in which the straight shank of the needle is longitudinally slidable and rotatably mounted.

21. In apparatus of the character set forth, a needle having a spiral portion, means for moving the needle longitudinally and rotating it, and a roller bearing for receiving the front end of the needle as it is advanced, said bearing having its axis of rotation transverse to the longitudinal direction of movement of the needle.

22. In apparatus of the character set forth, a needle having a substantially straight shank and a spiral front end, means for moving the needle longitudinally and rotating it, a bearing in which the straight shank of the needle is slidable and rotatable, and a roller bearing for receiving the front end of the needle as it is advanced.

23. In apparatus of the character set forth, a needle shaft having a spiral portion, a device slidably engaged with the spiral portion, means for effecting a relative movement between the device and shaft longitudinally of the latter, including a device with which the shaft has a rotatable engagement, and a spiral needle connected to the shaft.

24. In apparatus of the character set forth, a needle shaft having a spiral groove, a device slidably engaged in the groove, means for effecting a relative movement between the device and shaft longitudinally of the latter, including a device with which the shaft has a rotatable engagement, and a spiral needle connected to the shaft.

25. In apparatus of the character set forth, a needle shaft having a spiral groove provided with end portions disposed longitudinally of the shaft, a device slidably engaged in the spiral groove and movable into said end portions, means for effecting a longitudinal movement of the shaft and permitting its rotation, and a spiral needle connected to the shaft.

26. In apparatus of the character set forth, a support, a shaft longitudinally movable on the support and having a spiral groove, a device engaged in the groove to cause the rotation of the shaft on its longitudinal movement, a device for reciprocating said shaft and in which the shaft is rotatably mounted, and means for mounting a needle on said shaft.

27. In apparatus of the character set forth, a support, a shaft longitudinally movable on the support and having a spiral groove, a device engaged in the groove to cause the rotation of the shaft on its longitudinal movement, a reciprocatory device in which the shaft is rotatably mounted, means for reciprocating said device, and means for mounting a needle on said shaft.

28. In apparatus of the character set forth, a needle member, a work holder member, and means for relatively moving the members back and forth, including a rotatable member, an oscillatory member, means for oscillating the member, a clutch for automatically connecting said members to effect a complete step-by-step rotation of the rotatable member on successive oscillations of the oscillatory member, and means connected to the rotatable member for causing the needle to pass through the work placed on said holder.

29. In apparatus of the character set forth, a needle, a work holder, and means for relatively moving the same back and forth, including a rotatable member having a crank connection with one, an oscillatory member, means for oscillating the member to cause a movement of the same substantially 180°, and a clutch for automatically connecting the members during the movement of the oscillating member in one direction to effect a complete step-by-step rotation of the rotatable member on successive oscillations of the oscillatory member.

30. In apparatus of the character set forth, a support, a shaft longitudinally movable on the support and having a spiral groove, a device carried by the support and engaged in the groove for rotating the shaft on its longitudinal movement, a reciprocatory device with which the shaft has a rotatable engagement, means for mounting a needle on the shaft, a rotatable member having a crank connection with the device, a spring retracted oscillatory member having a clutch connection with the rotatable member, and means for moving the oscillatory member against the action of the spring.

31. In apparatus of the character set forth, a needle, means for advancing and retracting the needle, including a completely rotatable member having a crank connection with the needle, and an oscillatory member having a clutch connection with the rotatable member for intermittently operating said member step by step to effect its complete rotation.

32. In apparatus of the character set forth, a needle having an eye, means for causing the needle to traverse the work, a threading device, and means for passing the threading device through the needle eye and causing the portion of the device that passes through the eye to turn on its longitudinal axis.

33. In apparatus of the character set forth, a needle having an eye, means for causing the needle to traverse the work, a supporting device movable toward and from the needle, and a spiral threading device pivotally mounted on the supporting device and turning on its longitudinal axis, said device being movable through the needle eye.

34. In apparatus of the character set forth, a needle having an eye, means for causing the needle to traverse the work, and a spiral threading device movable through the eye and being caused to turn therein on its longitudinal axis during its passage.

35. In apparatus of the character set forth, the combination with a needle having an eye, means for causing the needle to traverse the work, a supporting device movable toward and from the needle, a spiral threading device journaled on the supporting device and movable through the needle eye, being turned thereby on its longitudinal axis during said movement, and means for moving the supporting device.

In testimony whereof we have hereunto set our hands this 12th day of March, 1914.

ELLSWORTH E. FLORA.
JOHN F. MURPHY.

In presence of two subscribing witnesses:
NELLIE B. DEARBORN,
FLORENCE A. FLORELL.

Copies of this patent may be obtained for five cents each, by addressing the "Commissioner of Patents, Washington, D. C."